US007009759B2

(12) United States Patent
Chou et al.

(10) Patent No.: US 7,009,759 B2
(45) Date of Patent: Mar. 7, 2006

(54) MULTIPLE CHANNEL OPTICAL FREQUENCY MIXERS FOR ALL-OPTICAL SIGNAL PROCESSING

(75) Inventors: Ming-Hsien Chou, Saratoga, CA (US); Krishnan Parameswaran, Mountain View, CA (US); Martin M. Fejer, Menlo Park, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 1104 days.

(21) Appl. No.: 09/821,701

(22) Filed: Mar. 28, 2001

(65) Prior Publication Data
US 2005/0280886 A1  Dec. 22, 2005

Related U.S. Application Data

(60) Provisional application No. 60/206,874, filed on May 24, 2000, provisional application No. 60/266,383, filed on Feb. 1, 2001.

(51) Int. Cl.
*G02F 1/365* (2006.01)
(52) U.S. Cl. ........................... 359/326; 359/332
(58) Field of Classification Search ......... 359/326–332
See application file for complete search history.

(56) References Cited

U.S. PATENT DOCUMENTS

| | | | |
|---|---|---|---|
| 5,434,700 A | 7/1995 | Yoo | 359/332 |
| 5,644,584 A | 7/1997 | Nam et al. | 372/20 |
| 5,815,307 A | 9/1998 | Arbore et al. | 359/328 |
| 5,825,517 A | 10/1998 | Antoniades et al. | 359/117 |
| 5,867,304 A | 2/1999 | Galvanauskas et al. | 359/333 |
| 5,912,910 A | 6/1999 | Sanders et al. | 372/22 |
| 6,021,141 A | 2/2000 | Nam et al. | 372/20 |
| 6,762,876 B1 * | 7/2004 | Tilleman et al. | 359/330 |
| 2002/0118439 A1 * | 8/2002 | Batchko | 359/326 |

OTHER PUBLICATIONS

S.J.B. Yoo, "Wavelength Conversion Technologies For WDM Network Applications," Journal of Lightwave Technology, vol. 14, No. 6, Jun. 1996, pp. 955-966.

J.P.R. Lacey; S.J. Madden; and M.A. Summerfield, "Four-Channel Polarization-Insensitive Optically Transparent Wavelength Converter," IEEE Photonics Technolgy Letters, vol. 9, No. 10, Oct. 1997, pp. 1355-1357.

M.L. Bortz, "Quasi-Phasematched Optical Frequency Conversion In Lithium Niobate Waveguides," Stanford University, 1995.

(Continued)

*Primary Examiner*—John D. Lee
(74) *Attorney, Agent, or Firm*—Lumen Intellectual Property Services, Inc.

(57) ABSTRACT

A multi-channel optical frequency mixer for all-optical signal processing and a method for engineering the same. The multi-channel mixer uses a nonlinear optical material exhibiting an effective nonlinearity $d_{eff}$ whose spatial distribution is defined by a quasi-phase-matching grating, e.g., a QPM grating. The spatial distribution is defined such that its Fourier transform to the spatial frequency domain defines at least two wavelength channels which are quasi-phase-matched for performing optical frequency mixing. The wavelength channels correspond to dominant Fourier components and the Fourier transform is appropriately adjusted using grating parameters such as grating periods, phase reversal sequences and duty cycles to include an odd or even number of dominant Fourier components. The multi-channel mixer can perform frequency mixing operations such as second harmonic generation (SHG), difference frequency generation (DFG), sum frequency generation (SFG), and parametric amplification.

52 Claims, 8 Drawing Sheets

OTHER PUBLICATIONS

M.L. Bortz; M. Fujimura; and M.M. Fejer, "Increased Acceptance Bandwidth for Quasi-Phasematched Second Harmonic Generation in $LiNbO_3$ Waveguides," Electronics Letters, vol. 30, Jan. 6, 1994, pp. 35-35.

L. Becouarn, et al., "Cascaded Second-Harmonic and Sum-Frequency Generation of a $CO_2$ Laser Using a Single Quasi-Phasematched GaAs Crystal," Conference on Lasers and Electro-Optics, IEEE, vol. 6, pp. 146-147, 1998.

C.Q. Xu; H. Okayama; and M. Kawahara, "1.5$\mu$m Band Efficient Broadband Wavelength Conversion By Difference Frequency Generation in a Periodically Domain-Inverted $LiNbO_3$ Channel Waveguide," Applied Physics Letters, vol. 63, Dec. 27, 1993, pp. 3559-3561.

C.Q. Xu; H. Okayama; and M. Kawahara, "Efficienct Broadband Wavlength Converter for WDM Optical Communication Systems," Conference on Optical Fiber Communication, IEEE, Feb. 20-25, 1994, Paper ThQ4.

M.H. Chou; I. Brener; M.M. Fejer; E.E. Chaban; and S.B. Christman, "1.5-$\mu$m-Band Wavelength Conversion Based on Cascaded Second-Order Nonlinearity in $LiNbO_3$ Waveguides," IEEE Photonics Technology Letters, vol. 11, No. 6, Jun. 1999, pp. 653-655.

M.H. Chou; J. Hauden, M.A. Arbore; and M.M. Fejer, "1.5-$\mu$m-Band Wavelength Conversion Based on Difference-Frequency Generation in $LiNbO_3$ Waveguides with Integrated Coupling Structures," Optics Letters, vol., 23, No. 13, Jul. 1, 1998, pp. 1004-1006.

\* cited by examiner

MULTIPLE CHANNEL OPTICAL FREQUENCY MIXERS FOR ALL-OPTICAL SIGNAL PROCESSING

RELATED APPLICATIONS

This application claims priority from Provisional Patent Application 60/206,874 filed on May 24, 2000 and from Provisional Patent Application 60/266,383 entitled "Multiple Channel Optical Frequency Mixers for All-Optical Signal Processing" filed on Feb. 1, 2001, both of which are incorporated herein by reference.

GOVERNMENT SPONSORSHIP

This invention was made with Government support under contract N00014-91-J-1050 awarded by the Department of the Navy ONR. The Government has certain rights in this invention.

FIELD OF THE INVENTION

The present invention relates generally to multi-channel optical frequency mixers using quasi-phase-matching for all-optical signal processing, and in particular to quasi-phase-matching gratings engineered to have multiple quasi-phase-matched channels for performing frequency mixing operations.

BACKGROUND OF THE INVENTION

The drive for robust, high-capacity information networks has resulted in many advances in the field of optical signal routing and processing. While most local networks still rely on electronics, many long distance communications lines are using optical signals to transmit information. Depending on the transmission protocols selected and transmission characteristics of the optical components used, the information-bearing optical signals are contained in a number of channels at predetermined optical frequencies. There are numerous protocols for defining channel parameters, including Wavelength Division Multiplexing (WDM) or Dense Wavelength Division Multiplexing (DWDM) protocols. The waveguides used in these long distance networks are optical fibers, which offer advantages such as low loss, immunity to interference and, most importantly, an extremely large bandwidth.

To transmit information, data is modulated on optical carrier a signals of wavelengths corresponding to the selected channels (e.g., WDM channels). The information-bearing carrier signals are combined at the transmitting end and sent via the optical fiber to the receiving end. Along the way, the signals encounter various active and passive network elements including routing nodes, frequently equipped with repeaters and dispersion compensation elements among others. Traditionally, at many of these nodes the signals are converted back into electronic form for processing. Afterwards, they are converted back into optical signals as they leave the node. Speed, bandwidth and power requirements can be limiting due to this conversion.

The above problems are circumvented in an all-optical network in which the nodes switch optical signals in the different wavelength channels in different directions generally without converting the optical signals into electronic form. Several concepts for all-optical WDM networks have been developed for this purpose. The fundamentals of all-optical routing operations require the ability to discriminate between two signals of wavelengths $\lambda_1$ and $\lambda_2$ and to switch them to different optical paths based on their wavelengths. Switches which can perform such operations are known in the art and include, among other, acousto-optically or electro-optically tunable filters and micro-electromechanical systems (MEMS). In addition, all-optical switches should also be able to perform wavelength conversion functions, i.e., switch the two optical signals between different optical carrier wavelengths, either within the immediate network or when transferring to a neighboring network. Such wavelength switches can be used to build wavelength interchangers or wavelength interchanging cross-connects. More information about such switches is provided by S. J. B. Yoo in "Wavelength Conversion Technologies for WDM Network Applications", Journal of Lightwave Technology, Vol. 14, No. 6, June 1996, pp. 955–66 as well as in U.S. Pat. No. 5,825,517 to Antoniades et al. and in the references cited therein.

In a practical all-optical network the nodes have to be able to perform frequency mixing operations on a large number of optical signals of different wavelengths, i.e., multiple signals contained in different channels. One way to achieve frequency mixing operations on a number of signals at multiple wavelengths is to employ separate discrete single channel devices. Typically, single channel frequency mixing devices employ an optical material exhibiting a nonlinear susceptibility to perform one or more frequency mixing operations. Among other, such operations can include second harmonic generation (SHG), difference frequency generation (DFG), sum frequency generation (SFG), or parametric amplification. For example, it is sometimes useful to perform SHG followed by DFG, which uses the second harmonic generated by SHG. General information about wavelength conversion in multiple WDM channels is provided by Lacey, J. P. R. et al., in "Four-Channel Polarization-Insensitive Optically Transparent Wavelength Converter", IEEE Photonics Technology Letters, Vol. 9, No. 10, October 1997, pp. 1355–7.

To achieve efficient frequency conversion many devices use quasi-phase-matching (QPM) to counteract the phase slip between the generating nonlinear polarization and the generated or converted optical field as these propagate through the nonlinear optical material. Thus, there is a phase velocity mismatch between the generating polarization and generated optical signals. QPM employs a grating in the nonlinear material to periodically compensate for this phase velocity mismatch. There are several methods for producing and tuning such QPM gratings and general information on the theory and applications of QPM within optical waveguides can be found in Michael L. Bortz's Doctoral Dissertation entitled "Quasi-Phasematched Optical Frequency Conversion in Lithium Niobate Waveguides", Stanford University, 1995 as well as M. L. Bortz et al., "Increased Acceptance Bandwidth for Quasiphasematched Second Harmonic Generation in $LiNbO_3$ Waveguides", Electronics Letters, Vol. 30, Jan. 6, 1994, pp. 34–5.

Several prior art references teach the use of QPM for purposes of phasematching signals with do not bear information. For example, U.S. Pat. No. 5,644,584 to Nam et al.; U.S. Pat. No. 5,912,910 to Sanders et al.; U.S. Pat. No. 6,021,141 to Nam et al. and Becouarn, L. et al., "Cascaded Second-Harmonic and Sum-Frequency Generation of a $CO_2$ Laser Using a Single Quasi-Phase-Matched GaAs Crystal", Conference on Lasers and Electro-Optics, IEEE, Vol. 6, pp. 146–7, 1998 teach conversion of output signals from lasers and conversion of optical signals which do not carry information.

Meanwhile, specific application of QPM based wavelength converters dealing with information-bearing signals and including WDM applications are discussed by C. Q. Xu et al., "1.5 µm Band Efficient Broadband Wavelength Conversion by Difference Frequency Generation in a Periodically Domain-Inverted $LiNbO_3$ Channel Waveguide", Applied Physics Letters, Vol. 63, 27 December 1993, pp. 3559–61; C. Q. Xu et al., "Efficient Broadband Wavelength Converter for WDM Optical Communication Systems", Conference on Optical Fiber Communication, IEEE, 20–25 February 1994; M. H. Chou et al., "1.5-µm-Band Wavelength Conversion Based on Cascaded Second-Order Nonlinearity in $LiNbO_3$ Waveguides", IEEE Photonics Technology Letters, Vol. 11, No. 6, June 1999, pp. 653–5; as well as M. H. Chou et al., "1.5-µm-Band Wavelength Conversion Based on Difference-Frequency Generation in $LiNbO_3$ Waveguides with Integrated Coupling Structures", Optics Letters, Vol. 23, No. 13, Jul. 1, 1998, pp. 1004–6. In addition, U.S. Pat. No. 5,434,700 to Yoo teaches an all-optical wavelength converter which uses an optical waveguide with regions having differing nonlinear optical susceptibilities such that the regions form a quasi-phase-matching grating. This single channel device is proposed for use in optical WDM networks to convert a single signal frequency.

Further, U.S. Pat. No. 5,815,307 to M. Arbore et al., and U.S. Pat. No. 5,867,304 to Galvanauskas et al. teach the use of aperiodic QPM gratings. In particular, these references teach the use of aperiodic QPM gratings in nonlinear materials for simultaneous frequency conversion and compression of optical pulses.

Unfortunately, setting up a number of single channel devices to perform frequency mixing operations on a number of signals in parallel is usually impractical and introduces excessive losses in the network. This is especially true when the number of channels or wavelengths is large, e.g., in the case of DWDM. Hence, it would be a significant advance to provide an apparatus and method for performing frequency mixing operations on signals in many wavelength channels simultaneously without having to use a number of dedicated single channel devices. Specifically, it would be very useful to have such apparatus tuned for frequency mixing operations using more than one short wavelength signals by having corresponding short wavelength channels.

OBJECTS AND ADVANTAGES

In view of the above, it is a primary object of the present invention to provide a multi-channel optical frequency mixer for frequency mixing operations. In particular, the frequency mixer is to be quasi-phase-matched to at least two short wavelength channels for performing these mixing operations.

It is also an object of the invention to provide a method for defining a quasi-phase-matching grating to achieve quasi-phase-matching in a number of short wavelength channels.

Yet another object of the invention is to provide a multi-channel optical frequency mixer and methods for engineering such mixers for phasematching wavelengths whose location and spacing is defined by the International Telecommunication Union (ITU) standards.

It is an additional object of the invention to provide a multi-channel optical frequency mixer which can be employed in devices such as a multiple channel add/drop, a multiple channel switch and a multiple channel optical sampler. The multi-channel mixer of the invention should likewise be adaptable to performing wavelength broadcasting wherein each of a number of input signals can be simultaneously converted into a number of output wavelengths. The multi-channel mixer should enable broadcasting by simultaneous utilization of multiple short wavelength channels.

Still another object of the invention is to ensure that the multi-channel optical mixer and engineering methods of the invention can be employed in optical networks such as WDM, DWDM, TDM and other networks.

Yet an additional object is to provide a multi-channel optical frequency mixer having the property of polarization-insensitive operation.

These and numerous other advantages of the present invention will become apparent upon reading the detailed description.

SUMMARY

In response to the objects set forth above, the present invention provides a multi-channel optical frequency mixer for all-optical signal processing. The multi-channel mixer has a nonlinear optical material exhibiting an effective nonlinearity $d_{eff}$. Further, the multi-channel mixer has a quasi-phase-matching grating defining a spatial distribution of the effective nonlinearity $d_{eff}$ in the nonlinear optical material. The spatial distribution is defined in such a manner that a Fourier transform of it to the spatial frequency domain defines at least two short wavelength channels which are quasi-phase-matched for performing optical frequency mixing.

The Fourier transform of the spatial distribution is such that it has at least two dominant Fourier components corresponding to the at least two short wavelength channels. In one embodiment, the Fourier transform of the spatial distribution has an even number of dominant Fourier components. In another embodiment, the Fourier transform of the spatial distribution has an odd number of dominant Fourier components.

The quasi-phase-matching grating, which can include an abrupt or continuous spatial variation of $d_{eff}$, has predetermined grating parameters selected to produce the at least two dominant Fourier components. The grating parameters which are appropriately chosen to produce the desired Fourier transform are the local grating periods, phase reversal sequences and duty cycles. In one embodiment a grating with a uniform grating period superposed by a phase reversal sequence with a 50% duty cycle is used to produce a Fourier transform with two dominant Fourier components and hence two quasi-phase-matched short wavelength channels for all-optical signal processing. In another embodiment a grating with a uniform grating period superposed by a phase reversal sequence with a 26.5% duty cycle is used to produce a Fourier transform with three equal dominant Fourier components and thus three quasi-phase-matched channels.

In a preferred embodiment, the multi-channel mixer has optical structures for in-coupling and out-coupling light into and out of the quasi-phase-matching grating. It is further preferred that the multi-channel mixer have at least one waveguide and that the quasi-phase-matching grating be distributed within that waveguide. The multi-channel mixer can be further equipped with a mode controlling structure for controlling the mode of light admitted into the waveguide.

The multi-channel mixer is fabricated in a substrate of nonlinear optical material. The nonlinear optical material is selected, among other, for its second order susceptibility $\chi^{(2)}$ enabling it to perform the frequency mixing operations. Thus, multi-channel mixer of the invention can perform any desired nonlinear optical frequency mixing operation. These nonlinear operations include second harmonic generation (SHG), difference frequency generation (DFG), sum frequency generation (SFG) and parametric amplification. Suitable nonlinear optical materials for performing these operations include one or more components selected among lithium niobate, lithium tantalate, $MgO:LiNbO_3$, $Zn:LiNbO_3$, $MgO:LiTaO_3$, stoichiometric lithium niobate, stoichiometric lithium tantalate, potassium niobate, KTP, isomorphs of KTP such as KTA, RTA, RTP, as well as GaAs and other members of the III–V semiconductor family. Of course, other suitable nonlinear optical materials can also be used in the multi-channel mixer of the invention.

As noted above, it is preferred that the mixer have a waveguide fabricated in or on the substrate made of the nonlinear optical material. For example, the waveguide is an in-diffused waveguide produced by a suitable method, as will be known to those skilled in the art.

The multi-channel mixer of the invention can have a polarization control system for rendering it polarization diverse. The polarization control system is typically made of several components selected among elements such as polarization mode separators, polarization rotators, optical isolators, optical circulators, optical fibers, polarization maintaining fibers and polarization controllers.

In accordance with the method of invention the spatial distribution of the effective nonlinearity $d_{eff}$ in the nonlinear optical material is defined by the quasi-phase-matching grating. The Fourier transform of the spatial distribution defines at least two short wavelength channels quasi-phase-matched for performing optical frequency mixing. At least two dominant Fourier components correspond to these at least two short wavelength channels. Specifically, grating parameters such as grating periods, phase reversal sequences and duty cycles are set to produce these at least two dominant Fourier components. Appropriate choice of phase reversal sequence or sequences is used to set the number of dominant Fourier components. The grating periods are selected to define the location of the dominant Fourier components.

The light can be in-coupled and out-coupled of the quasi-phase-matching grating using appropriate optical structures (e.g., lenses, wave guide mode filters, waveguide tapers, waveguide directional couplers etc.). Typically, the light comprises one or more beams. For the purpose of all-optical signal processing, one or more of these beams can be impressed with information.

In some embodiments the second order susceptibility of the nonlinear optical material is used twice in cascaded optical frequency mixing; $\chi^{(2)}:\chi^{(2)}$ (cascaded mixing per se being known to those skilled in the art). These schemes allow one to perform two frequency mixing operations in the same quasi-phase-matching grating (e.g., SHG and DFG).

It is also noted that the light in-coupled into the quasi-phase-matching grating can comprise at least two long wavelength beams. In these situations, the optical frequency mixing can be performed simultaneously on the long wavelength beams.

Thus, in general, the invention provides a method for engineering multi-channel mixers by selecting the spatial distribution of the effective nonlinearity $d_{eff}$ of the nonlinear optical material such that at least two short wavelength channels are quasi-phase-matched for performing optical frequency mixing.

A detailed description of the invention and the preferred and alternative embodiments is presented below in reference to the attached drawing figures.

DETAILED DESCRIPTION

Theory Review and Prior Art Discussion

Figure 1A:
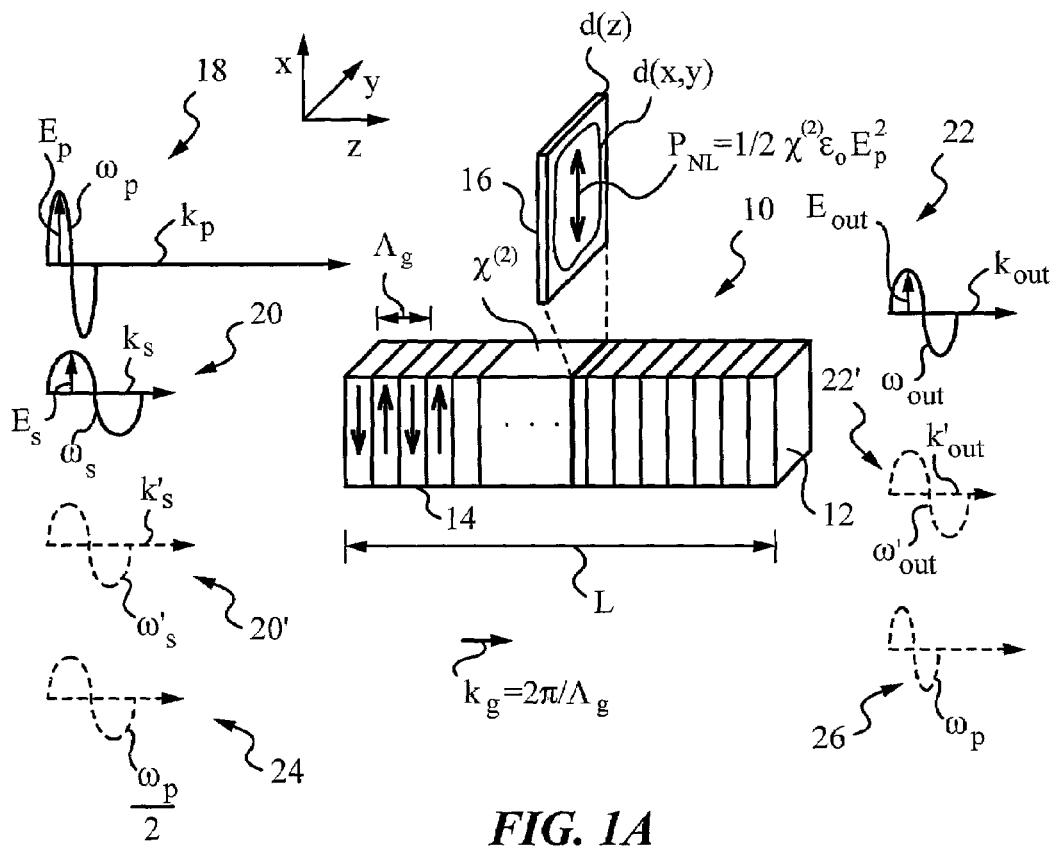
FIG. 1A is a diagram illustrating the principles of quasi-phase-matched nonlinear mixing in a single channel optical frequency mixer in accordance with the prior art.

The method of the invention will be best understood by first reviewing the theory of quasi-phase-matching based on prior art quasi-phase-matching grating 10 of FIG. 1A. Grating 10 is a uniform quasi-phase-matching (QPM) grating 10 of length L and is fabricated in a nonlinear optical material 12. Material 12 has a second order nonlinear susceptibility $\chi^{(2)}$ enabling it to perform optical frequency mixing operations. The nonlinear susceptibility of material 12 is characterized by a spatial distribution of nonlinearity in material 12. In single-domain bulk form of material 12 the distribution is described by a nonlinear coefficient $d_o$.

In the present case, the spatial distribution of the nonlinearity varies in a manner conveniently described with the aid of normalized nonlinearity distributions. As shown in transverse cross section or slice 16 of material 12, the nonlinearity has a normalized nonlinearity distribution $d(x,y)$ in the x-y plane with a value normalized to range from 0 to 1. Further, the nonlinearity has a normalized nonlinearity distribution $d(z)$ along the z axis normalized to range from 1 to −1. (It is noted that in some cases such factorization of the nonlinearity distribution to $d(x,y)$ and $d(z)$ may not be possible). Here, the z-axis is conveniently chosen as the direction along which optical frequency mixing is performed (direction of light propagation).

The nonlinear coefficient $d_o$ expressed with the aid of its normalized nonlinearity distributions is related to the second order nonlinear susceptibility $\chi^{(2)}$ by:

$$\chi^{(2)}=2d_o d(x,y)d(z).$$

QPM grating 10 has a number of regions 14 of alternating sign of nonlinear susceptibility $\chi^{(2)}$ as indicated by the arrows. This is easily accomplished by engineering the nonlinearity such that the sign of the normalized nonlinearity distribution $d(z)$ in adjacent regions 14 alternates between −1 and 1. Methods for engineering the nonlinearity to achieve such distribution $d(z)$ are known in the art. For example, if material 12 is a ferroelectric it can be periodically poled. A person skilled in the art will be familiar with numerous other methods for engineering the nonlinearity depending on the type of material 12.

Light waves of different frequencies traveling through nonlinear optical material 12 experience phase slip with respect to one another. This is because they see different indices of refraction in material 12 causing them to propagate at different phase velocities. In other words, they experience a phase velocity mismatch. Nonlinear optical frequency mixing involves a driving nonlinear polarization and interacting light waves at two or more frequencies and is thus affected by phase slip. QPM grating 10 periodically counteracts the effects of the phase slip because the second order susceptibility $\chi^{(2)}$ in adjacent regions 14 is engineered to alternate in sign. Specifically, the thickness of regions 14 is such that when the driving polarization and interacting waves have slipped off by $\pi$, as it happens over a certain distance of travel referred to as the coherence length $L_c$, they enter into the next region 14 with reversed sign of linear susceptibility $\chi^{(2)}$. In other words, the thickness of regions 14 is set to the value of the coherence length $L_c$. Consequently, the driving polarization and interacting waves which slip off by $\pi$ over coherence length $L_c$ and would, due to their out-of-phase relationship, reverse the nonlinear frequency mixing operation over the next coherence length $L_c$ (thus undoing the results of frequency mixing performed over the first coherence length $L_c$), continue to perform the desired frequency mixing operation in the subsequent region 14. Based on this, it is also clear that QPM grating 10 should strive for a large number of regions 14 (i.e., large length L) to increase the efficiency of nonlinear mixing.

It is further useful to consider the action of QPM grating 10 during a particular nonlinear mixing process involving light of three different frequencies (three-wave mixing). This process can be a difference frequency generation (DFG) operation involving a short wavelength beam 18, frequently referred to in such cases as a pump beam, and a long wavelength beam 20, frequently referred to such cases as a signal beam, and an output beam 22, which is also at a long wavelength. Short wavelength beam 18 is defined by an electric field $E_p$ propagating at an angular frequency $\omega_p$ and having a corresponding wave vector $k_p$. Long wavelength beam 20 is defined by an electric field $E_s$ at an angular frequency $\omega_s$ and a wave vector $k_s$. Similarly, output beam 22 is defined by an electric field $E_{out}$ at an angular frequency $\omega$out and a wave vector $k_{out}$. The phase mismatch $\Delta k$ of these three beams 18, 20, 22 is counteracted by a grating vector $k_g$ of QPM grating 10 related to regions 14 via the period $\Lambda g$ ($k_g=2\pi/\Lambda_g$) as follows:

$$k_p - k_s - k_{out} = 2\pi\left(\frac{n_p}{\lambda_p} - \frac{n_s}{\lambda_s} - \frac{n_{out}}{\lambda_{out}}\right) = \Delta k = k_g.$$

In this equation $n_p$, $n_s$, $n_{out}$ are the respective indices of refraction experienced by beams 18, 20, 22 at their respective frequencies, here expressed in terms of their corresponding wavelengths $\lambda_p$, $\lambda_s$, $\lambda_{out}$.

Figure 1B:
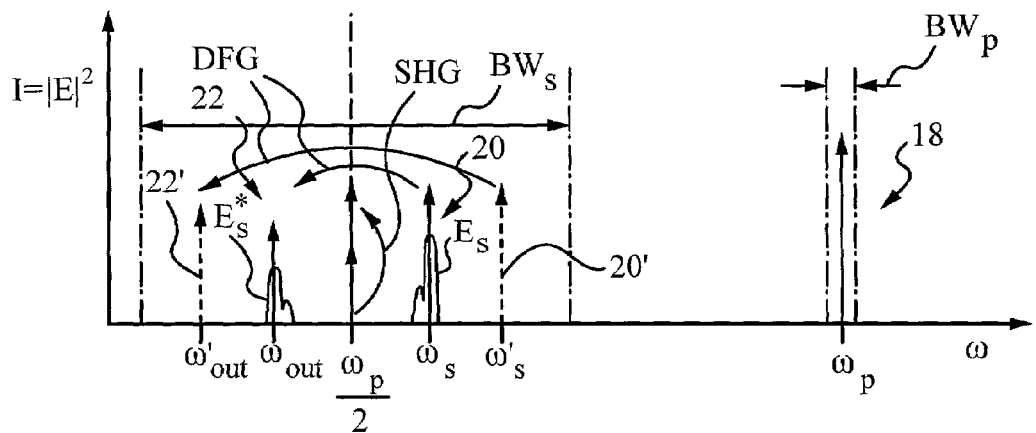
FIG. 1B is a diagram illustrating second harmonic generation (SHG) and difference frequency generation (DFG) using the single channel optical frequency mixer of FIG. 1A in accordance with the prior art.

When pump beam 18 and signal beam 20 enter QPM grating 10 they start to generate output beam 22 by DFG using the second order nonlinear susceptibility $\chi^{(2)}$ of material 12, as shown in FIG. 1B. (A person skilled in the art will recognize that other nonlinear mixing processes also take place within material 12. These are not discussed at this point for reasons of clarity.) The nonlinear mixing process is driven by the nonlinear polarization $P_{NL}$ set up in material 12, as illustrated in slice 16 of material 12 in FIG. 1A. Disregarding the dispersive nature of nonlinear susceptibility $\chi^{(2)}$ nonlinear polarization $P_{NL}$ is established in proportion to the nonlinear susceptibility $\chi^{(2)}$ and also in proportion to the square of the total electric field $E^2$ of all three interacting waves or beams 18, 20 and 22. This relationship can be expressed as:

$$P_{NL} = \frac{1}{2}\chi^{(2)}\varepsilon_0 E_p^2,$$

where $\varepsilon_o$ is the permittivity of free space. As these three beams 18, 20 and 22 propagate through material 12, QPM grating 10 does not allow nonlinear polarization $P_{NL}$ driving the frequency conversion process and the beams to slip out of phase by any more than $\pi$, as explained above. Hence, efficient generation of output beam 22 at angular frequency $\omega_{out}$ takes place over length L of QPM grating 12.

From the above equations, it can be shown that the portion of nonlinear polarization $P_{NL,\ out}$ responsible for DFG generation of output beam 22 is described by:

$$P_{NL,\ out}=2d_o d(x,y)d(z)\varepsilon_o E_p E_s^*,$$

where the asterisk denotes the conjugate of electric field $E_s$ of long wavelength beam 20. This process is visualized in FIG. 1B, where it is seen that short wavelength beam 18 at $\omega_p$ mixes with long wavelength beam 20 at $\omega_s$ to produce output beam 22 at $\omega_{out}$ "mirrored" with respect to half the pump frequency $\omega_p/2$ by DFG. Thus, output beam 22 depends on the conjugate electric field $E^*_s$ of electric field $E_s$ of long wavelength beam 20.

It should be noted that the DFG conversion has a predetermined efficiency less than 100% and thus the intensity of output beam 22 is lower than that of long wavelength beam 20. (In fact, under most conditions the output power, $P_{out}$ is proportional to the product of pump power and signal power.) It should also be noted that same QPM grating 10 can be used to perform second harmonic generation (SHG) of short wavelength beam 18 at $\omega_p$ by using a long wavelength beam 24 at $\omega_p/2$. In this case, long wavelength beam 24 at $\omega_p/2$ is commonly referred to as the pump. The SHG process is well-known and also indicated in FIG. 1B. The quasi-phase-matching condition for SHG is:

$$k_{\omega_p}=2k_{\omega_p/2}-k_g.$$

QPM grating 10 has a wide tuning range or bandwidth $BW_s$ for performing DFG using short wavelength beam 18. For example, long wavelength beam 20 can be substituted by another long wavelength beam 20' having an angular frequency $\omega'_s$ substantially larger than $\omega_s$, and a wave vector $k'_s$ correspondingly larger than wave vector $k_s$ of beam 20. Now, output beam 22' is reflected about $\omega_p/2$ by DFG to a lower angular frequency $\omega'_{out}$ out with a correspondingly smaller wave vector $k'_{out}$ than output beam 22. Thus, the DFG process using short wavelength beam 18 remains substantially quasi-phase-matched by QPM grating 10. In other words, because the wave vectors of input and output beams 20, 22 change in opposite sense grating vector $k_g$ still approximately satisfies the condition that:

$$k_p - k_s' - k_{out}' = k_g.$$

By virtue of this property of QPM grating 10, tuning bandwidth $BW_s$ for long wavelength beam 20 when performing DFG with a fixed short frequency beam 18 is typically on the order of tens of nanometers in wavelength.

Unfortunately, the same is not true for a tuning range or bandwidth $BW_p$ for short wavelength beam 18. In general, short wavelength beam 18 can only be tuned over a very narrow bandwidth (typically only a few nm or less) while still maintaining the quasi-phase-matching condition in QPM grating 10. In other words, only one narrow short wavelength channel defined by bandwidth $BW_p$ is available for short wavelength beam 18. In this sense QPM grating 10 employed in nonlinear material 12 can only yield a single short wavelength channel optical frequency mixer. Such single channel mixer has only limited usefulness for optical signal processing, e.g., all-optical processing, as already remarked in the background section.

EMBODIMENTS OF THE INVENTION

Figure 2:
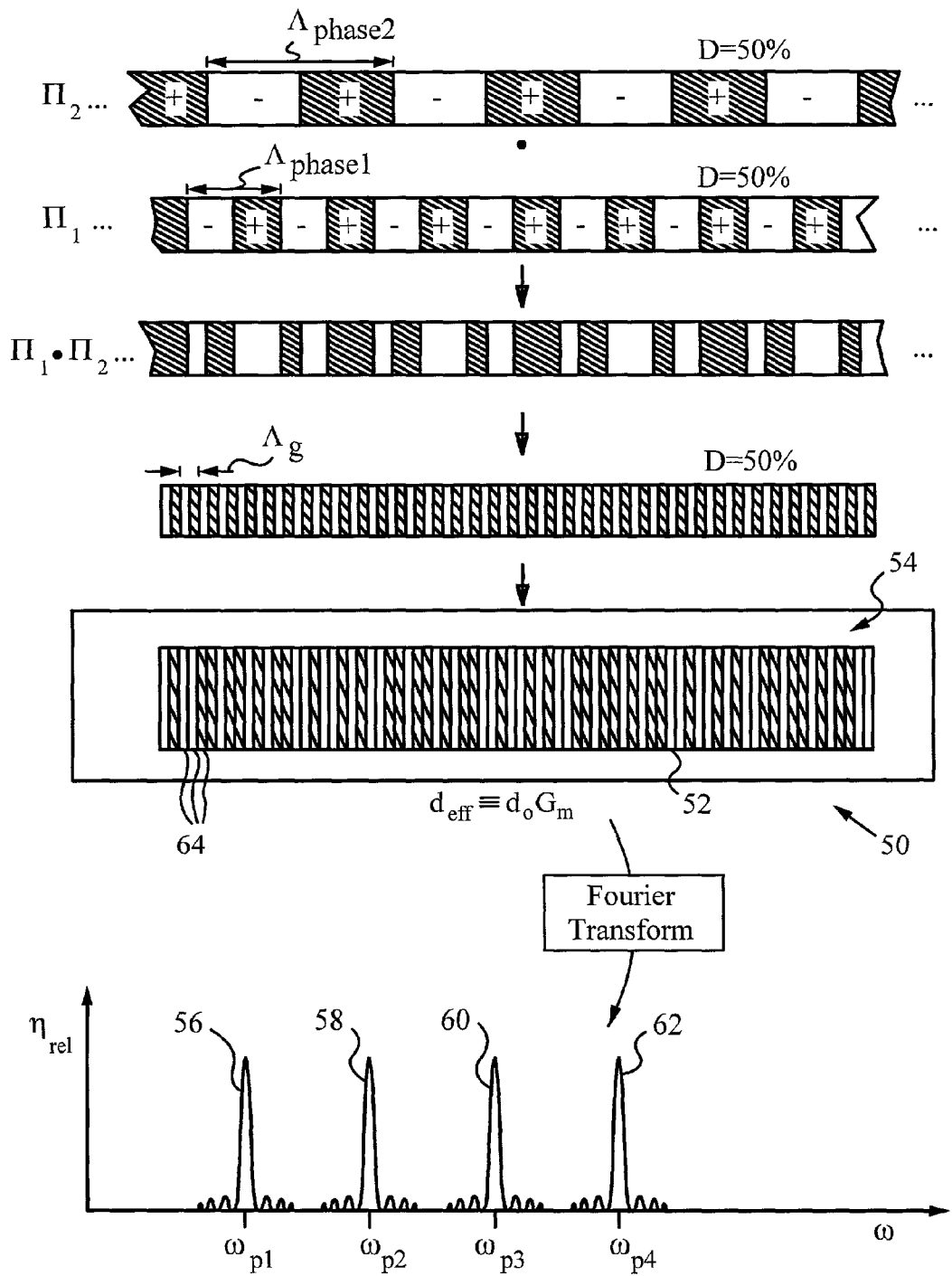
FIG. 2 is a diagram illustrating the fundamental concepts of using the Fourier transform for engineering multi-channel optical frequency mixers in accordance with the invention.

In accordance with the invention, a multi-channel optical frequency mixer 50, as shown in FIG. 2, is made in a nonlinear optical material 52. Material 52 is selected for its second order nonlinear susceptibility $\chi^{(2)}$ as well as other material properties known to a person skilled in the art to be used for the desired optical frequency mixing operation or operations. Materials which can be used in optical material 52 can be selected from among lithium niobate, lithium tantalate, MgO:LiNbO₃, Zn:LiNbO₃, MgO:LiTaO₃, stoichiometric lithium niobate, stoichiometric lithium tantalate, potassium niobate, KTP, isomorphs of KTP such as KTA, RTA, RTP, as well as GaAs and other members of the III–V semiconductor family. A person skilled in the art will realize that numerous other materials and groups of materials exhibiting suitably large nonlinear susceptibility $\chi^{(2)}$ and other advantageous material properties for optical frequency mixing are available and can be used in optical material 52.

A quasi-phase-matching grating 54 defines a spatial distribution of an effective nonlinearity $d_{eff}$. QPM grating 54 is engineered to yield a particular Fourier transform of the effective nonlinearity $d_{eff}$. Specifically, the spatial distribution of the effective nonlinearity $d_{eff}$ is defined by QPM grating 54 in such manner that the Fourier transform of that spatial distribution to the spatial frequency domain defines at least two short wavelength channels 56, 58 which are quasi-phase-matched for performing optical frequency mixing.

Grating 54 has a number of regions 64 in which the normalized nonlinearity distribution d(z) has a different magnitude or sign. For example, the normalized nonlinearity distribution d(z) in adjacent regions 64 exhibits a sign reversal. Regions 64 do not form a grating with a single uniform grating period $\Lambda_g$. In fact, grating 54 is made up of several components. In the embodiment shown, grating 54 has a grating period $\Lambda_g$ with a 50% duty cycle superposed by a first phase reversal sequence $\Pi_1$ of period $\Lambda_{phase1}$ with a 50% duty cycle and by a second phase reversal sequence $\Pi_2$ of period $\Lambda_{phase2}$ also with a 50% duty cycle.

Conveniently, the superposition of grating period $\Lambda_g$ by phase reversal sequences with periods $\Lambda_{phase1}$ and $\Lambda_{phase2}$ can be defined in terms of an effective nonlinearity $d_{eff}$ along the z-direction as:

$$d_{eff}(z) = d_o d(x,y) G_m,$$

where $G_m$ is a Fourier coefficient of the Fourier decomposition of $d_{eff}(z)$ and $d_o$ is the effective nonlinear coefficient of bulk material 52. It is known in the art of mathematics that periodic functions can be Fourier decomposed into a Fourier series. It is also known that Fourier series can be appropriately chosen to produce certain desired functions. The components of the Fourier series exist in an adjoint space. In the case of the spatial distribution of deft defined by grating 54, the adjoint space is the spatial frequency domain. The Fourier transform of the effective nonlinearity $d_{eff}$ defined by grating 54 thus defines Fourier components in the spatial frequency domain.

In free space spatial frequencies associated with light waves are conveniently characterized by wave vectors k. Inside nonlinear material 52, however, wave vectors k are replaced by propagation constants β, which vary with angular frequency ω of the wave, i.e., β=β(ω). That is because within nonlinear material 52 propagation constant β experiences dispersion. The group velocity $v_g$ of any light wave of bandwidth Δω in medium 52 can be expressed as:

$$v_g = \left(\frac{d\beta}{d\omega}\right)_{\omega_c},$$

evaluated at central frequency $\omega_c$ of bandwidth Δω. This linear relationship does not take into account higher order dispersion terms and hence can only be used to the extent that higher order terms in the relationship between ω and β can be neglected. In some nonlinear frequency mixing processes, e.g., in interactions between two light beams whose wave vectors k are near-degenerate or degenerate, the above linear relationship will not be sufficient to establish the relationship between ω and β. That is because the linear terms will cancel and hence the higher order terms will become important. In these cases a Taylor expansion around the center angular frequency $\omega_c$ can be performed to obtain the higher order terms and thus obtain a sufficiently accurate relationship between β and ω.

In cases where β and ω are related by the linear relationship, the Fourier components existing in the spatial frequency domain are related to the temporal frequency domain, i.e., they are related to angular frequencies ω via the reciprocal of group velocity, $1/v_g$, and in the case of a bandwidth Δω they are related via $1/\Delta v_g$. A person skilled in the art of mathematics will be able to derive the appropriate relationship between ω and β for cases where higher order terms are important. Thus, the Fourier transform corresponds to components 56, 58, 60 and 62 in the time frequency domain, as will also be appreciated by a person skilled in the art of mathematics. In fact, components 56, 58, 60 and 62 are the four major or dominant Fourier components corresponding to angular frequencies $\omega_{p1}$, $\omega_{p2}$, $\omega_{p3}$ and $\omega_{p4}$, as shown in FIG. 2. In other words, the tuning curve defining the relative conversion efficiency $\eta_{rel}$ versus angular frequency $\omega$ of pump beams in QPM grating 54 has four main peaks at 56, 58, 60 and 62.

Multi-channel mixer 50 is thus a four-channel device and is capable of performing optical mixing operations with short wavelength beams contained in the four short wavelength channels centered at angular frequencies $\omega_{p1}$, $\omega_{p2}$, $\omega_{p3}$ and $\omega_{p4}$. In other words, grating 54 ensures that the quasi-phase-matching condition is satisfied for optical frequency mixing operations which use short wavelength beams at these four frequencies.

Figure 3A:
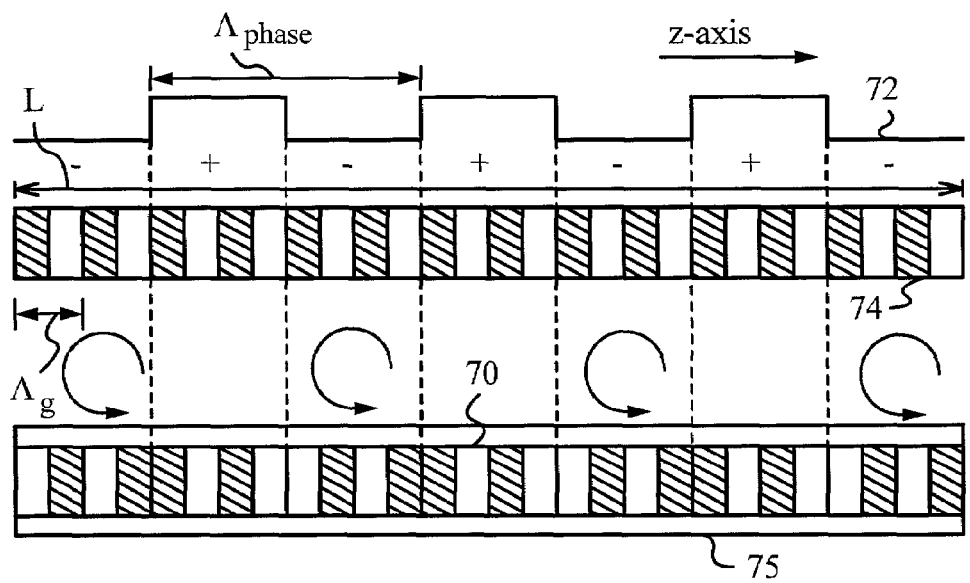
FIG. 3A is a diagram illustrating a two-channel mixer obtained by a superposition of a phase reversal sequence on a QPM grating with a uniform grating period.
Figure 3B:
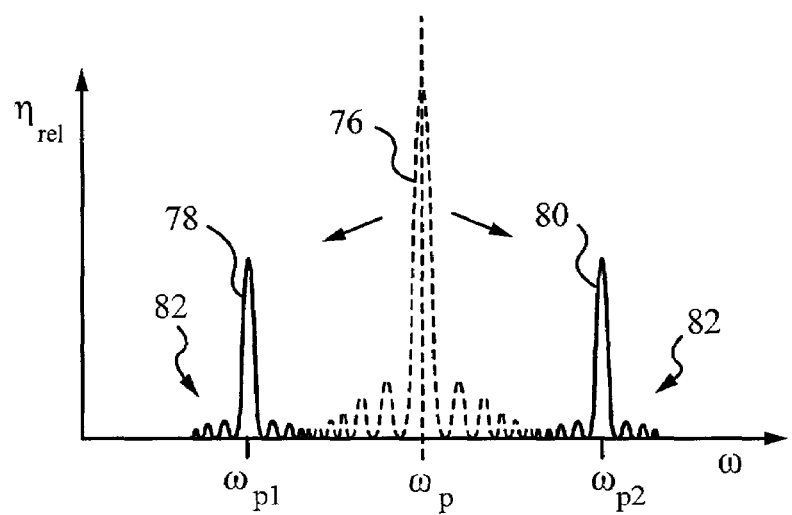
FIG. 3B is a graph of the Fourier transform of the superposition of the phase reversal sequence and grating of the two-channel mixer of FIG. 3A.

FIGS. 3A and 3B show in more detail the engineering of a two-channel optical mixer 75 using a QPM grating 70 in accordance with the invention. Referring to FIG. 3A, it is shown that QPM grating 70 is obtained by superposing a phase reversal sequence 72 of period $\Lambda_{phase}$ with a substantially 50% duty cycle on a uniform QPM grating 74 of period $\Lambda_g$ and a substantially 50% duty cycle. By itself, uniform QPM grating 74 yields a single channel device. That is because the Fourier transform of a uniform grating or, equivalently, of a periodic square function, is a sinc function with a single dominant Fourier component 76 corresponding to $\omega_p$ as indicated in FIG. 3B. Because grating 70 also contains phase reversal sequence 72, the Fourier transform of QPM grating 70 is the convolution of the sinc function representing the Fourier transform of grating 74 and a comb function, in this case with two major peaks and a number of minor peaks due to phase reversal sequence 72. This convolution produces two dominant Fourier components 78, 80 corresponding to angular frequencies $\omega_{p1}$ and $\omega_{p2}$. It should be noted that to first order these two angular frequencies are evenly spaced from the angular frequency $\omega_p$ of single-channel grating 74. Thus, adding phase reversal sequence 72 has caused a split of the dominant Fourier component 76 of uniform grating 74 into dominant Fourier components 78, 80.

The Fourier transform of QPM grating 70 also has a number of peaks or higher order harmonics, generally indicated by 82. The harmonics are due to the "squareness" of grating 74. These higher order harmonics 82 are small in comparison to dominant Fourier components 78, 80 and will generally not be relied upon for performing optical frequency mixing. It will be understood by a person skilled in the art that such higher order harmonics may be generally eliminated by use of filter design techniques including, but not limited to apodization of QPM grating 70. Meanwhile, dominant Fourier components 78, 80 correspond to the two channels centered at frequencies $\omega_{p1}$ and $\omega_{p2}$ of two-channel QPM grating 70.

Figure 4:
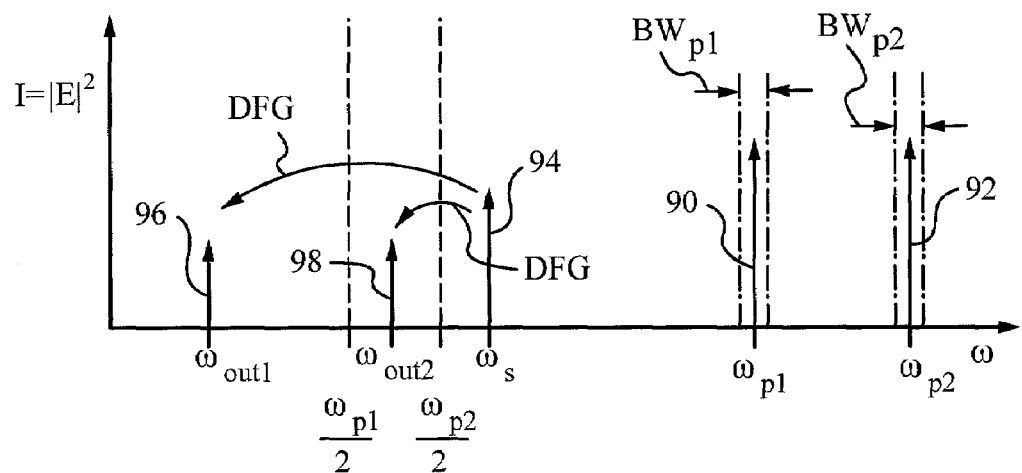
FIG. 4 illustrates difference frequency generation (DFG) using two wavelength channels produced by the grating of FIG. 3A.

The operation of two-channel mixer 75 based on an exemplary DFG process is illustrated in FIG. 4. As in FIG. 1B, light beams are represented by arrows indicating beam intensities centered at corresponding center angular frequencies. In contrast to prior art devices, two-channel mixer 75 accepts two short wavelength beams 90, 92 at angular frequencies $\omega_{p1}$ and $\omega_{p2}$ corresponding to dominant Fourier components 78, 80. Since the operation being performed is DFG short wavelength beams 90, 92 are acting as pump beams in this case. Each beam 90, 92 has a tuning bandwidth $BW_{p1}$, $BW_{p2}$ which is related to the associated dominant Fourier component as the width of the spatial Fourier transform scaled by $\Delta v^{-1}$. When a long wavelength beam 94, in this case a signal beam, at angular frequency $\omega_s$ is input into two-channel mixer 75 it produces a first output beam 96 at angular frequency $\omega_{out1}$ by DFG with beam 90 via nonlinear susceptibility $\chi^{(2)}$. Beam 94 can also produce a second output beam 98 at angular frequency $\omega_{out2}$ by DFG with beam 92. (It should be noted that beams 90 and 92 do not need to be present in mixer 75 simultaneously.) Hence, QPM grating 70 engineered according to the invention defines two short wavelength channels, centered at $\omega_{p1}$ and $\omega_{p2}$, quasi-phase-matched for performing optical frequency mixing, in this case DFG.

Beams 90, 92 can be input into mixer 75 simultaneously or at different times to perform DFG with long wavelength beam 94 simultaneously or at different times. Also, more than one long wavelength beam can take advantage of the two pump beams for optical frequency mixing operations. For example, two or more long wavelength beams can be supplied to mixer 75 and the optical frequency mixing can be performed simultaneously on these two or more long wavelength beams. Of course, two-channel mixer 75 can also be used to perform other optical frequency mixing operations. These nonlinear operations can involve second harmonic generation (SHG), sum frequency generation (SFG) and parametric amplification. It is also possible to perform several different mixing operations in mixer 75 at the same time, e.g., SHG and DFG, as will be appreciated by those skilled in the art. For example, this can be done by using the second order susceptibility of the nonlinear optical material twice in cascaded optical frequency mixing; $\chi^{(2)}$: $\chi^{(2)}$. Cascaded schemes are known in the art and allow one to perform two frequency mixing operations in the same quasi-phase-matching grating (e.g., SHG and DFG).

Two-channel mixer 75 with QPM grating 70 has taken advantage of the Fourier transform of phase reversal sequence 72 to "split" the one short wavelength channel offered by QPM grating 74 into two short wavelength channels. Referring back to QPM grating 54, the superposition of two phase reversal sequences on a uniform grating "splits" one short wavelength channel offered by the uniform grating into four short wavelength channels. In fact, a person skilled in the art of mathematics will recognize that any desired even number of dominant Fourier components and hence even number of short wavelength channels can be produced by a superposition of the appropriate number of phase reversal sequences on a uniform grating. Of course, a person skilled in the art will also be familiar with the nature of the Fourier transform and appreciate that there are many ways in which the spatial distribution of the effective nonlinearity $d_{eff}$ can be engineered to produce an even number of dominant Fourier components and hence short wavelength channels.

Figure 5:
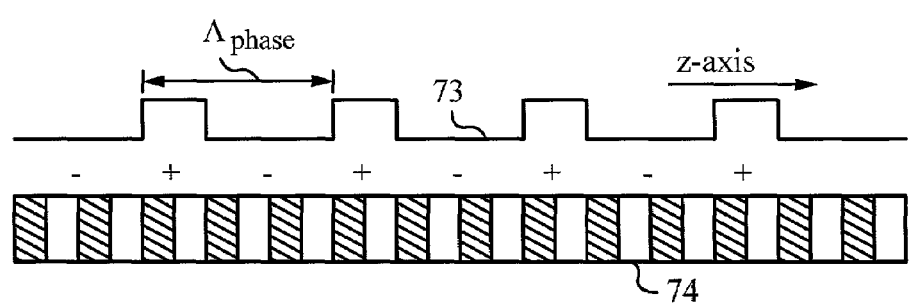
FIG. 5 is a diagram illustrating the superposition of a phase reversal sequence with a 26.5% duty cycle on a QPM grating with a uniform grating period.

In some embodiments an odd number of short wavelength channels is required in multi-channel mixer 75. FIG. 5 illustrates uniform grating 74 superposed by a phase reversal sequence 73 with a duty cycle of approximately 26.5%. The Fourier transform of the spatial distribution of a QPM grating produced by this superposition has three equal amplitude dominant Fourier components. Specifically, in addition to the two new dominant Fourier components corresponding to $\omega_{p1}$ and $\omega_{p2}$, it retains a dominant Fourier component corresponding to the location of the original dominant Fourier component of uniform grating 74, i.e., at $\omega_p$. A person skilled in the art of mathematics will recognize that by altering the duty cycles of phase reversal sequences it is possible to engineer QPM gratings with an odd number of dominant Fourier components.

In some embodiments grating 74 can additionally contain a chirp. The chirp can be produced in grating 74 to compress the light by counteracting phase dispersion during the frequency mixing process. Techniques for chirping QPM gratings are known in the art and a skilled artisan will find information on its implementation, e.g., in U.S. Pat. No. 5,815,307 to M. Arbore et al.

Figure 6:
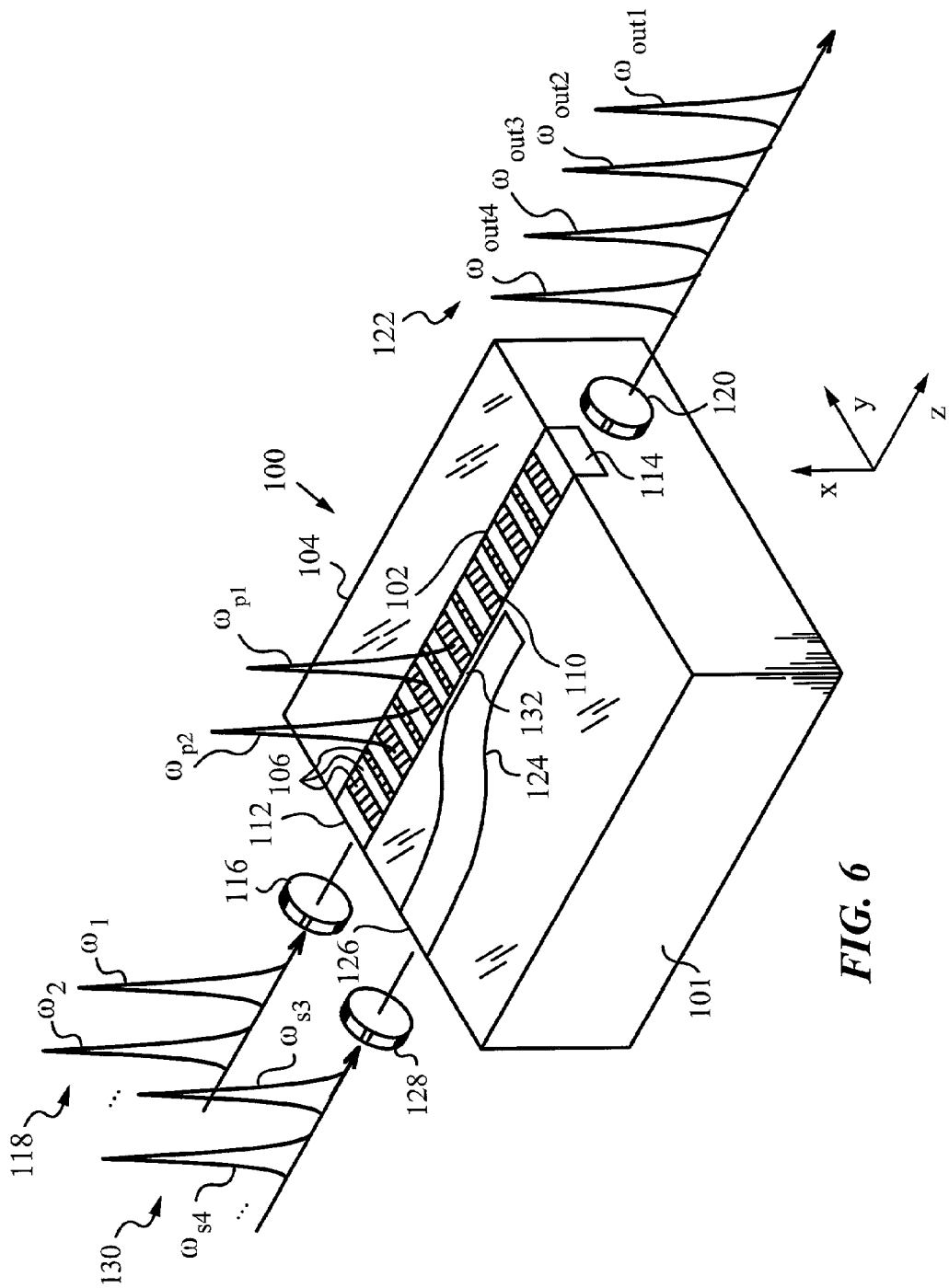
FIG. 6 is an isometric view of a multi-channel frequency mixer in accordance with the invention.

The QPM grating engineering techniques of the invention can be used to make a variety of multi-channel mixers in various configurations. FIG. 6 is an isometric view of a multi-channel mixer 100 equipped with a QPM grating 102 provided in a substrate 104. Conveniently, entire substrate 104 is made of a nonlinear optical material 101 or materials which are to perform optical mixing operations expected of multi-channel mixer 100. Thus, nonlinear optical material 101 can consist of one or more of material components including without limitation, lithium tantalate, MgO:LiNbO$_3$, Zn:LiNbO$_3$, MgO:LiTaO$_3$, stoichiometric lithium niobate, stoichiometric lithium tantalate, potassium niobate, KTP, isomorphs of KTP such as KTA, RTA, RTP, or GaAs or other members of the III–V semiconductor family as well as any organic nonlinear materials and nonlinear polymers. A person skilled in the art will recognize that the exact choice of material depends on various considerations including the type of mixing operations which will be performed in QPM grating 102. In fact, even organic nonlinear materials and nonlinear polymers could be used as material 101.

QPM grating 102 is made up of domains or regions 106 defining a spatial distribution of the effective nonlinearity $d_{\it eff}$. To achieve this, regions 106 can be formed by appropriate growth of regions 106 to produce different non-linear orientations in adjacent regions 106. Alternatively, regions 106 can be obtained by poling in cases when material 101 is a ferroelectric material, a polymer or glass. A person skilled in the art will appreciate that there are numerous techniques which can be used to produce regions 106 as required for grating 102 depending on the type of material 101 selected.

QPM grating 102 is distributed within a waveguide 110. The use of waveguide 110 in material 101 is preferred because it aids in guiding the interacting light beams and generally results in better conversion efficiencies during the nonlinear optical mixing operations as compared to bulk material. For example, waveguide 110 is fabricated within nonlinear optical material 101 after QPM grating 102. When nonlinear optical material 101 is LiNbO$_3$ or LiTaO$_3$ waveguide 110 may comprise waveguide structures that include, without limitation, annealed proton exchanged (APE) waveguides, buried waveguides, metal in-diffused waveguides (including metals such as zinc, titanium, etc.) as will be understood by those knowledgeable in the art.

Waveguide 110 has an input facet 112 and an output facet 114. In the present embodiment, input facet 112 and output facet 114 are located at opposing side walls of substrate 104. Input facet 112 has an associated in-coupling or coupling element 116, in this case a lens, for in-coupling light 118 into waveguide 110. An out-coupling element 120 is provided past output facet 114 for guiding output light 122 exiting through output facet 114. A person skilled in the art will recognize that other coupling devices such as tapers in waveguide 110 can be employed in conjunction with or without a lens to serve the function of coupling elements 116 and 120. In general, coupling element 116 and coupling element 120 may include without limitation optical elements such as optical fiber, prism couplers, waveguide mode filters, waveguide couplers, and tapered waveguide regions. In particular, mode controlling structures for controlling the mode of light admitted into waveguide 110 can be used to maximize the overlap of interacting beams. As is known in the art, maximizing this overlap will ensure high efficiency of the frequency mixing operations performed by multi-channel mixer 100. A person skilled in the art will appreciate that the best choice of coupling element 116 is made by considering the wavelengths and modes of light which are to be coupled into QPM grating 102.

In the present embodiment, substrate 104 also has a waveguide 124 with an input facet 126 and an associated in-coupling element 128 for in-coupling additional light 130. This arrangement can be used when light 130 is not required for the nonlinear mixing operation in first section of QPM grating 102 or if it can not be efficiently in-coupled together with light 118 via in-coupling element 116. Once again, coupling element 128 can include an appropriate taper of the waveguide 124 and/or any of the optical elements listed above.

Waveguide 124 is formed such that it extends next to and parallel to waveguide 110 where QPM grating 102 is distributed. This arrangement forms a coupling or junction 132 between waveguides 124 and 110 and permits light 130 to be in-coupled via the evanescent field into waveguide 110. A person skilled in the art will recognize that junction 132 is merely one exemplary structure for accomplishing this goal and that light 130 can be in-coupled into waveguide 110 using other types of junctions which may include without limitation, Y-junctions and directional couplers.

QPM grating 102 is multi-channel. Specifically, QPM grating 102 is two-channel for quasi-phase-matching optical frequency mixing operations which use two short wavelength channels $\omega_{p1}$ and $\omega_{p2}$. Thus, QPM grating 102 is analogous to QPM grating 70 discussed above.

During operation, in-coupling element 116 couples light 118 into waveguide 110 and QPM grating 102. In the present embodiment light 118 contains two long wavelength beams at angular frequencies $\omega_1$, $\omega_2$. Angular frequencies $\omega_1$, $\omega_2$ are chosen to be half the frequencies of short wavelength channels $\omega_{p1}$ and $\omega_{p2}$ respectively. For illustrative purposes FIG. 6 shows only portions of these beams in the form of pulses. It will be understood, however, that continuous-wave beams can be used for any of these beams.

The first section of QPM grating 102 is used to generate two second harmonics at $\omega_{p1}$ and at $\omega_{p2}$ of long wavelength beams at $\omega_1$, $\omega_2$. It should be noted long wavelength beams at $\omega_1$, $\omega_2$ play the role of pump beams within the first section of QPM grating 102 when generating the second harmonics at $\omega_{p1}$ and at $\omega_{p2}$. The two second harmonics, which are short wavelength beams, continue to propagate into the second section of QPM grating 102.

Light 130 in the form of two additional long wavelength beams at $\omega_3$ and $\omega_4$ couples into waveguide 110 at junction 132. These two beams propagate into second section of QPM grating 102 along with second harmonics at $\omega_{p1}$ and $\omega_{p2}$. In second section of QPM grating 102 second harmonics $\omega_{s1}$ and $\omega_{s2}$ obtained in the first section of QPM grating 102 act as pump beams. Specifically, in the second section they mix with long wavelength beams at $\omega_3$, $\omega_4$ to produce output light 122 by DFG. DFG between $\omega_{p1}$, and $\omega_3$, $\omega_4$ respectively generates output beams $\omega_{out1}$, $\omega_{out2}$ while DFG between $\omega_{p2}$, and $\omega_3$, $\omega_4$ respectively generates output beams $\omega_{out3}$, $\omega_{out4}$. Output light 122 is out-coupled from multi-channel mixer 100 via coupling element 120.

The power conversion performance of QPM grating 102 in the small signal limit the output power can be expressed as:

$$P_{\omega_{out}} \approx \eta_{norm} P_{\omega_s} P_{\omega_p} \left| \frac{1}{L} \int_0^L \Pi(z) \exp(-j\Delta\beta z) \, dz \right|^2 \qquad \text{eq. 1}$$

where $P_\omega^p$, $P_\omega^s$ and $P_\omega^{out}$ are conventionally referred to as pump, signal and converted output powers expressed in terms of their angular frequencies. For example, in the first section of QPM grating 102 during SHG generation of $\omega_{P1}$ $\omega_P=\omega_1$ and $\omega_S=\omega_1$, and $P_\omega^{out}$ is the power of second harmonic generated at $\omega_{P1}$. For DFG generation of $\omega_{out1}$ in the second section of QPM grating 102 $\omega_p=\omega_{P1}$ and $\omega_S=\omega_3$, and $P_\omega^{out}$ is the power of the DFG output beam at $\omega_{out1}$. $\eta_{norm}$ is the normalized efficiency in units of $W^{-1}$, which is proportional to the square of the device length L (in this case the length of the first section of QPM grating 102 for SHG and the length of second section of QPM grating 102 for DFG) and the square of the modal overlap of the interacting beams with the second-order optical nonlinearity $\chi^{(2)}$ of material 101. The term $\Delta\beta$ can be expressed as:

$$\Delta\beta = 2\pi(n_p/\lambda_p - n_s/\lambda_s - n_{out}/\lambda_{out} - 1/\Lambda_g), \quad \text{eq. 2}$$

where the refractive indices n are the effective indices at the corresponding wavelengths $\lambda$, and $\Delta\beta$ represents the phase mismatch between the interacting waves and uniform QPM grating 74 with superposed phase-reversal sequence 72 (period $\Lambda_{phase}$). From this equation it is clear how mismatch arises due to different effective indices of refraction $n_p$, $n_s$ and $n_{out}$ experienced in material 101 by pump, signal and converted output frequencies, here expressed in terms of their wavelengths $\lambda_p$, $\lambda_s$ and $\lambda_{out}$. Finally, $\Pi(z)$ is the superimposed phase-reversal sequence 72.

In the particular case of QPM grating 102 phase-reversal sequence 72 has a grating period of $\Lambda_{phase}$ and a duty cycle of 50%. Thus, first phase-reversal sequence 72 can be expressed as:

$$\Pi(z) = \sum_{n=1}^{\infty}\left(\frac{2}{\pi n}\right)[\exp(jK_n z) + \exp(-jK_n z)] \text{ where } K_n = \frac{2\pi n}{\Lambda_{phase}}. \quad \text{eq. 3}$$

Substituting the above expression for $\Pi(z)$ into eq. 1 yields:

$$P_{\omega_{out}} \approx \quad \text{eq. 4}$$

$$\eta_{norm} P_{\omega_p} P_{\omega_s} \sum_{n=1,3,5...}^{\infty} \left(\frac{2}{\pi n}\right)^2 \left[\text{sinc}^2\left(\frac{\Delta\beta + K_n}{2}L\right) + \text{sinc}^2\left(\frac{\Delta\beta - K_n}{2}L\right)\right].$$

For n=1 this equation results in a tuning curve with phase-matching frequencies corresponding to the two dominant Fourier components (see FIG. 3B), as discussed above.

Figure 7:
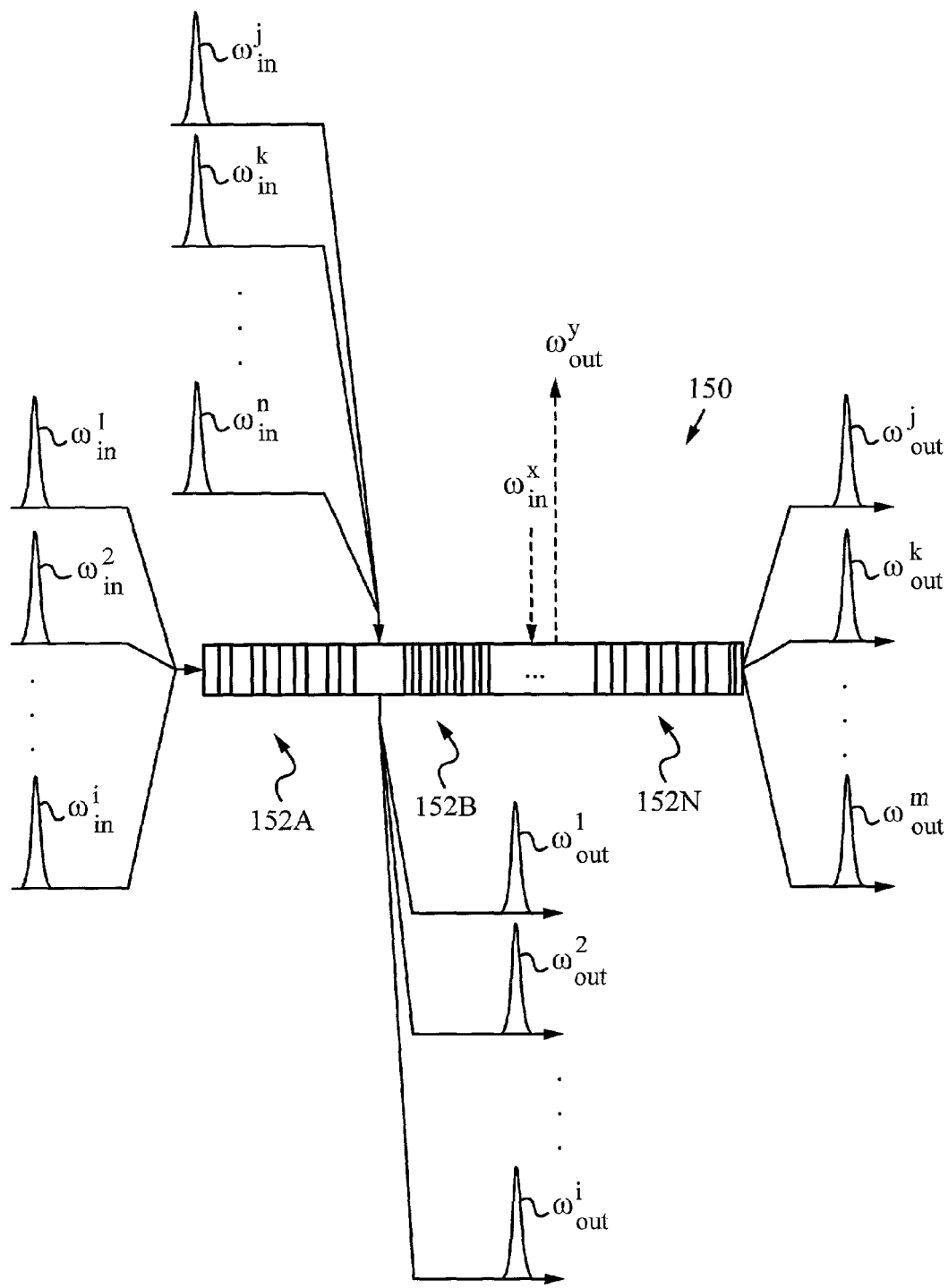
FIG. 7 is a generalized multi-channel mixer in accordance with the invention.

It will be clear to a person skilled in the art that the embodiment in FIG. 6 illustrates only one exemplary multi-channel optical mixer 100 which performs SHG and DFG using two short wavelength channels. The generalized embodiment in FIG. 7 illustrates a multi-channel mixer 150 which can perform a number of nonlinear mixing operations in series on various beams. Mixer 150 has a number of QPM gratings 152A, 152B, ..., 152N engineered according to the invention. It should be noted that although gratings 152A, 152B, ..., 152N are shown in the form of discrete gratings, they can be substituted by non-discrete gratings. In other words, gratings 152A, 152B, ..., 152N can exhibit a continuous variation in $d_{eff}$ (e.g., $d_{eff}(z)$ varies continuously between −1 and 1). Input and output beams can be added and retrieved beetween gratings 152A, 152B, ..., 152N as required with appropriate elements known in the art, e.g., directional couplers.

Mixer 150 accepts a number of input beams at frequencies $\omega_{in}^1$ through $\omega_{in}^x$. For purposes of all-optical signal processing any one of these signals can be impressed with information. In fact, any beam can carry information irrespective of whether it is an input beam at a short wavelength corresponding to the short wavelength channel of the particular QPM grating or is a long wavelength beam. Thus, in any frequency mixing operation the beam carrying the information can be the pump beam or the signal beam or both. Methods for modulating information on optical beams are well-known in the art.

FIGS. 8A–D show several example applications of multi-channel mixers according to the invention. These types of multi-channel mixers can be used in WDM, DWDM and TDM optical networks or other types of optical networks.

Figure 8A:
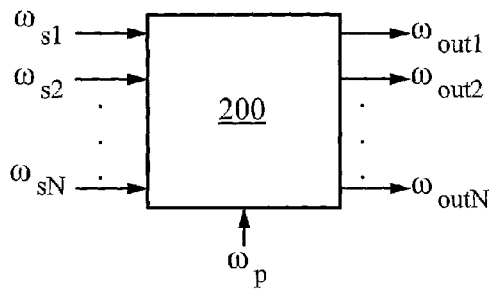
FIGS. 8A–D illustrates devices employing multi-channel mixers of the invention for WDM purposes.

In FIG. 8A a multi-channel mixer 200 is used to dynamically reconfigure N converted output frequencies. In this case light in the form of long wavelength beams at N signal frequencies $\omega_{s1}$ through $\omega_{sN}$ impressed with information is input into multi-channel mixer 200. Then, a light beam at an appropriate pump frequency $\omega_p$ is selected for performing DFG. Specifically, pump frequency $\omega_p$ can be selected in any one of the multiple short wavelength channels for which multi-channel mixer 200 has been designed in accordance with the invention. The pump frequency $\omega_p$ determines, through DFG, the frequency of output beams at output frequencies $\omega_{out1}$ through $\omega_{outN}$ (based on $\omega_{out}=\omega_p-\omega_s$). Thus, information input at signal frequencies $\omega_{s1}$ through $\omega_{sN}$ exits multi-channel mixer 200 at output frequencies $\omega_{out1}$ through $\omega_{outN}$. The N converted output frequencies $\omega_{out1}$ through $\omega_{outN}$ can correspond, e.g., to WDM channels of an optical network.

Figure 8B:
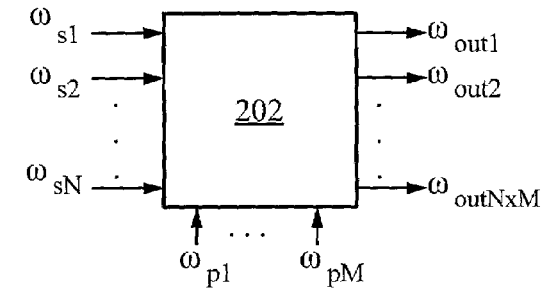

FIG. 8B shows a multi-channel mixer 202 used for frequency broadcasting also referred to as wavelength broadcasting. In this case light at each of N signal frequencies $\omega_{s1}$ through $\omega_{sN}$ is converted into M output frequencies by using M pump frequencies $\omega_{p1}$ through $\omega_{pM}$. Once again, the conversion is accomplished by DFG.

Figure 8C:
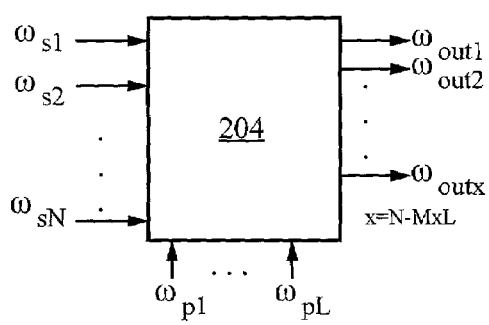

FIG. 8C shows a multi-channel mixer 204 used for reconfigurably dropping frequencies or wavelengths. This is performed on N signal frequencies $\omega_{s1}$ through $\omega_{sN}$ by converting them using L pump frequencies $\omega_{p1}$ through $\omega_{pL}$ to output frequencies outside the range of frequencies supported by the WDM network. By doing this, selected signal frequencies can be dropped from the WDM network. Once again, this operation can be performed by DFG.

Figure 8D:
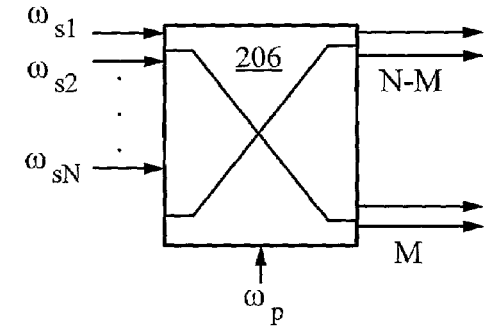

FIG. 8D shows a multi-channel mixer 206 used for switching or guiding N signal frequencies $\omega_{s1}$ through $\omega_{sN}$ with the aid of a reconfigurable pump frequency $\omega_p$. It will be clear to a person skilled in the art that channel drop, switch, sample as well as many other useful functions can be realized using multi-channel mixers 200, 202, 204 and 206 in WDM networks. In fact, multi-channel mixers 200, 202, 204 and 206 can be configured for phasematching wavelengths whose location and spacing is defined by the International Telecommunication Union (ITU) standards. Furthermore, multi-channel mixers of the invention employed in networks can use any suitable frequency mixing operation to perform the required functions. A person skilled in the art will realize that the functions of the various light beams will be chosen by the designer. Depending on the frequency mixing operation, pump beams, signal beams, low-power beams, high-power beams, continuous-wave beams, pulsed beams as they are known in the art, can all be appropriately manipulated by multi-channel mixers according to the invention and any of these beams (with the exception of continuous-wave beams) be impressed with information.

Figure 9:
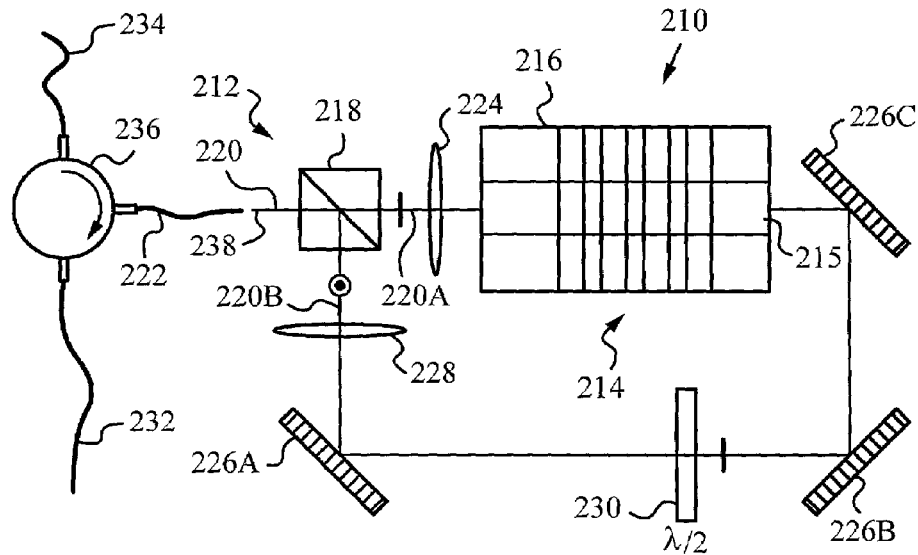
FIG. 9 shows a multi-channel mixer with a polarization control system for rendering it polarization insensitive.

FIG. 9 shows a multi-channel mixer 210 with a polarization control system 212 for rendering mixer 210 polarization insensitive or polarization diverse. Mixer 210 has a QPM grating 214 engineered in accordance with the invention in a waveguide 215 produced in a nonlinear optical material substrate 216. Polarization control system 212 has a polarizing beam splitter 218 for splitting light 220 delivered from a fiber 222 into its two orthogonal polarizations. After the split, p-polarized light 220A is coupled into mixer 210 with the aid of coupling element 224 from the left. Meanwhile, s-polarized light 220B follows a path defined by mirrors 226A, 226B and 226C. Along this path a coupling element 228 ensures that s-polarized light 220B is efficiently in-coupled into mixer 210 and a half-wave plate 230 rotates s-polarized light 220B by 90° to coincide in its polarization state with p-polarized light 220A. After being rotated, light 220B is in-coupled into mixer 210 from the right.

Output light 238 from multi-channel mixer 210 exits to the right and left from mixer 210. After retracing the paths of input light 220A and 220B output light 238 passes through beam splitter 218 and back into fiber 222. The present embodiment conveniently uses a circulator 236 for managing intput light 220 and output light 238. Light 220 is delivered from fiber 234 via circulator 236 into fiber 222. Output light 238, traveling in the opposite direction from light 220, enters circulator 236 and is passed on to fiber 232.

A person skilled in the art will recognize that polarization control system 212 can be replaced by alternative systems performing the same function. These systems can employ several components selected among elements such as polarization mode separators, polarization rotators, optical isolators, optical circulators, optical fibers, polarization maintaining fibers and polarization controllers to achieve the same functionality as system 212.

Figure 10:
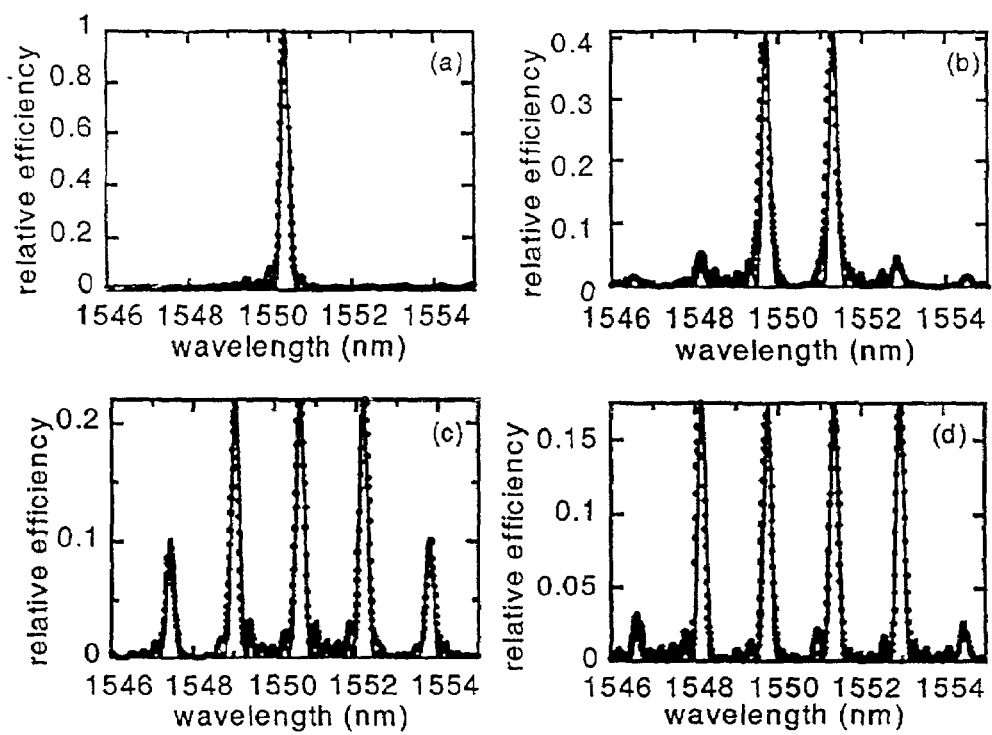
FIG. 10 are graphs illustrating SHG conversion efficiencies for 2-, 3- and 4-channel mixers in accordance with the invention.

Finally, the performance of multi-channel mixers engineered in accordance with the invention is illustrated in the graphs of FIG. 10. These graphs represent a comparison of SHG wavelength tuning curves for a single channel prior art mixer in (a), and two-channel, three-channel and four-channel mixers in (b), (c) and (d) respectively. The closed circles are measured results and the solid lines are the theoretical fits. The efficiencies are relative to the peak efficiency ($\approx 500\%/W$) of a one-channel mixer.

A person skilled in the art will recognize that multi-channel mixers of the invention can be further modified in many ways to suit the particular needs at hand. Accordingly, the scope of the invention should be determined by the following claims and their legal equivalents.

What is claimed is:

1. A multi-channel optical frequency mixer for all-optical signal processing comprising:
   a) a nonlinear optical material having an effective nonlinearity $d_{eff}$;
   b) a quasi-phase-matching grating defining a spatial distribution of said effective nonlinearity $d_{eff}$ in said nonlinear optical material, such that a Fourier transform of said spatial distribution to the spatial frequency domain defines at least two short wavelength channels quasi-phase-matched for performing optical frequency mixing.

2. The multi-channel optical frequency mixer of claim 1, wherein said Fourier transform of said spatial distribution comprises at least two dominant Fourier components corresponding to said at least two short wavelength channels.

3. The multi-channel optical frequency mixer of claim 2, wherein said Fourier transform of said spatial distribution comprises an even number of said dominant Fourier components.

4. The multi-channel optical frequency mixer of claim 2, wherein said Fourier transform of said spatial distribution comprises an odd number of said dominant Fourier components.

5. The multi-channel optical frequency mixer of claim 2, wherein said quasi-phase-matching grating has predetermined grating parameters for producing said at least two dominant Fourier components.

6. The multi-channel optical frequency mixer of claim 5, wherein said predetermined grating parameters are selected from the group consisting of grating periods, phase reversal sequences and duty cycles.

7. The multi-channel optical frequency mixer of claim 5, wherein said grating has a uniform grating period superposed by a phase reversal sequence.

8. The multi-channel optical frequency mixer of claim 7, wherein said phase reversal sequence has a predetermined duty cycle.

9. The multi-channel optical frequency mixer of claim 2, wherein said quasi-phase-matching grating further comprises a chirp.

10. The multi-channel optical frequency mixer of claim 2, further comprising optical structures for in-coupling and out-coupling light into and out of said quasi-phase-matching grating.

11. The multi-channel optical frequency mixer of claim 1, further comprising at least one waveguide.

12. The multi-channel optical frequency mixer of claim 11, wherein said quasi-phase-matching grating is distributed within said at least one waveguide.

13. The multi-channel optical frequency mixer of claim 11, further comprising a mode controlling structure.

14. The multi-channel optical frequency mixer of claim 1, wherein said nonlinear optical material comprises a substrate having at least one component selected from the group consisting of lithium niobate, lithium tantalate, MgO:LiNbO$_3$, Zn:LiNbO$_3$, MgO:LiTaO$_3$, stoichiometric lithium niobate, stoichiometric lithium tantalate, potassium niobate, KTP, KTA, RTA, RTP and members of the III–V semiconductor family.

15. The multi-channel optical frequency mixer of claim 14, further comprising a waveguide in or on said substrate.

16. The multi-channel optical frequency mixer of claim 15, wherein said waveguide is an in-diffused waveguide.

17. The multi-channel optical frequency mixer of claim 1, further comprising a polarization control system for rendering said multi-channel optical frequency mixer polarization diverse.

18. The multi-channel optical frequency mixer of claim 17, wherein said polarization control system comprises at least one element selected from the group consisting of polarization mode separator, polarization rotator, optical isolator, optical circulator, optical fiber, polarization maintaining fiber and polarization controller.

19. A method of all-optical signal processing using multi-channel optical frequency mixing comprising:
   a) providing a nonlinear optical material having an effective nonlinearity $d_{eff}$;
   b) defining a spatial distribution of said effective nonlinearity $d_{eff}$ in said nonlinear optical material with a quasi-phase-matching grating, such that a Fourier transform of said spatial distribution to the spatial frequency domain defines at least two short wavelength channels quasi-phase-matched for performing optical frequency mixing.

20. The method of claim 19, wherein said Fourier transform of said spatial distribution is defined to have at least two dominant Fourier components corresponding to said at least two short wavelength channels.

21. The method of claim 20, wherein said Fourier transform of said spatial distribution is defined to have an even number of said dominant Fourier components.

22. The method of claim 20, wherein said Fourier transform of said spatial distribution is defined to have an odd number of said dominant Fourier components.

23. The method of claim 20, wherein said quasi-phase-matching grating has predetermined grating parameters, and said method further comprises setting said predetermined grating parameters to produce said at least two dominant Fourier components.

24. The method of claim 23, wherein said predetermined grating parameters are selected from the group consisting of grating periods, phase reversal sequences and duty cycles.

25. The method of claim 24, wherein said grating periods are selected to define the location of said at least two dominant Fourier components.

26. The method of claim 20, further comprising providing a chirp in said quasi-phase-matching grating.

27. The method of claim 20, further comprising apodizing said dominant Fourier components to eliminate higher harmonics.

28. The method of claim 19, further comprising in-coupling and out-coupling light into and out of said quasi-phase-matching grating.

29. The method of claim 19, wherein said optical frequency mixing comprises at least one mixing operation selected from the group consisting of second harmonic generation, difference frequency generation, sum frequency generation, and parametric amplification.

30. The method of claim 19, wherein said optical frequency mixing comprises a cascaded optical frequency mixing.

31. The method of claim 19, wherein light comprising at least two long wavelength beams is in-coupled into said quasi-phase-matching grating and said optical frequency mixing is performed simultaneously on said at least two long wavelength beams.

32. A method for engineering a multi-channel optical frequency mixer comprising:
   a) providing a non-linear optical material having an effective nonlinearity $d_{eff}$;
   b) determining at least two short wavelength channels; and
   c) producing a quasi-phase-matching grating in said nonlinear optical material to define a spatial distribution of said effective nonlinearity $d_{eff}$, such that said at least two short wavelength channels are quasi-phase-matched for performing optical frequency mixing;
   wherein said quasi-phase-matching grating is produced by selecting a Fourier transform of said spatial distribution to the spatial frequency domain to define at least two dominant Fourier components corresponding to said at least two short wavelength channels.

33. The method of claim 32, wherein said selecting is performed by setting at least one parameter of said quasi-phase-matching grating selected from the group consisting of grating period, phase reversal sequence, and duty cycle.

34. A multi-channel optical frequency mixer produced by the method of claim 32.

35. A multi-channel optical frequency mixer for all-optical signal processing using at least two long wavelength beams, said multi-channel optical frequency mixer comprising:
   a) a nonlinear optical material having an effective nonlinearity $d_{eff}$;
   b) a quasi-phase-matching grating defining a spatial distribution of said effective nonlinearity $d_{eff}$ in said nonlinear optical material, such that a Fourier transform of said spatial distribution to the spatial frequency domain defines at least two short wavelength channels quasi-phase-matched for performing optical frequency mixing.

36. The multi-channel optical frequency mixer of claim 35, wherein said Fourier transform of said spatial distribution comprises at least two dominant Fourier components corresponding to said at least two short wavelength channels.

37. The multi-channel optical frequency mixer of claim 36, wherein said Fourier transform of said spatial distribution comprises an even number of said dominant Fourier components.

38. The multi-channel optical frequency mixer of claim 36, wherein said Fourier transform of said spatial distribution comprises an odd number of said dominant Fourier components.

39. The multi-channel optical frequency mixer of claim 36, wherein said quasi-phase-matching grating has predetermined grating parameters for producing said at least two dominant Fourier components.

40. The multi-channel optical frequency mixer of claim 39, wherein said predetermined grating parameters are selected from the group consisting of grating periods, phase reversal sequences and duty cycles.

41. The multi-channel optical frequency mixer of claim 39, wherein said grating has a uniform grating period superposed by a phase reversal sequence.

42. The multi-channel optical frequency mixer of claim 41, wherein said phase reversal sequence has a predetermined duty cycle.

43. The multi-channel optical frequency mixer of claim 36, wherein said quasi-phase-matching grating further comprises a chirp.

44. The multi-channel optical frequency mixer of claim 36, further comprising optical structures for in-coupling and out-coupling light into and out of said quasi-phase-matching grating.

45. The multi-channel optical frequency mixer of claim 35, further comprising at least one waveguide.

46. The multi-channel optical frequency mixer of claim 45, wherein said quasi-phase-matching grating is distributed within said at least one waveguide.

47. The multi-channel optical frequency mixer of claim 45, further comprising a mode controlling structure.

48. The multi-channel optical frequency mixer of claim 35, wherein said nonlinear optical material comprises a substrate having at least one component selected from the group consisting of lithium niobate, lithium tantalate, MgO:LiNbO$_3$, Zn:LiNbO$_3$, MgO:LiTaO$_3$, stoichiometric lithium niobate, stoichiometric lithium tantalate, potassium niobate, KTP, KTA, RTA, RTP and members of the III–V semiconductor family.

49. The multi-channel optical frequency mixer of claim 48, further comprising a waveguide in or on said substrate.

50. The multi-channel optical frequency mixer of claim 49, wherein said waveguide is an in-diffused waveguide.

51. The multi-channel optical frequency mixer of claim 35, further comprising a polarization control system for rendering said multi-channel optical frequency mixer polarization diverse.

52. The multi-channel optical frequency mixer of claim 51, wherein said polarization control system comprises at least one element selected from the group consisting of polarization mode separator, polarization rotator, optical isolator, optical circulator, optical fiber, polarization maintaining fiber and polarization controller.

* * * * *